United States Patent
Ma et al.

(10) Patent No.: US 9,646,766 B2
(45) Date of Patent: May 9, 2017

(54) METHOD OF MAKING DIELECTRIC CAPACITORS WITH INCREASED DIELECTRIC BREAKDOWN STRENGTH

(75) Inventors: Beihai Ma, Naperville, IL (US); Uthamalingam Balachandran, Willowbrook, IL (US); Shanshan Liu, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 69 days.

(21) Appl. No.: 13/523,335

(22) Filed: Jun. 14, 2012

(65) Prior Publication Data

US 2013/0335882 A1    Dec. 19, 2013

(51) Int. Cl.
 *H01G 4/008* (2006.01)
 *H01G 4/10*  (2006.01)
 *H01G 4/12*  (2006.01)
 *H01G 4/30*  (2006.01)

(52) U.S. Cl.
 CPC ........... *H01G 4/008* (2013.01); *H01G 4/10* (2013.01); *H01G 4/12* (2013.01); *H01G 4/1209* (2013.01); *H01G 4/30* (2013.01); *Y10T 29/435* (2015.01)

(58) Field of Classification Search
 CPC  H01G 4/005; H01G 4/12; H01G 4/10; H01G 4/20
 USPC ........................................ 361/313, 311, 305
 See application file for complete search history.

(56) References Cited

U.S. PATENT DOCUMENTS

| | | | | |
|---|---|---|---|---|
| 3,496,434 A | * | 2/1970 | Prokopowicz | H01G 4/30 361/303 |
| 5,280,407 A | * | 1/1994 | Brennan | 361/311 |
| 5,812,363 A | * | 9/1998 | Kuroda et al. | 361/306.3 |
| 5,835,338 A | * | 11/1998 | Suzuki et al. | 361/301.4 |
| 6,492,222 B1 | * | 12/2002 | Xing | G11C 11/22 257/E21.009 |
| 6,753,193 B2 | * | 6/2004 | Kim | 438/3 |
| 6,975,500 B2 | * | 12/2005 | Hunt et al. | 361/306.3 |
| 7,428,137 B2 | | 9/2008 | Dowgiallo, Jr. | |
| 7,436,650 B2 | | 10/2008 | Oguni et al. | |

(Continued)

FOREIGN PATENT DOCUMENTS

| | | | |
|---|---|---|---|
| JP | 01220421 A | * | 9/1989 |
| JP | 01220422 A | * | 9/1989 |

(Continued)

OTHER PUBLICATIONS

F.M. Pontes, et al, High dielectric constant of SrTiO3 thin films prepared by chemical process, Journal Materials Science 35 (2000), p. 4783.

(Continued)

*Primary Examiner* — David M Sinclair
(74) *Attorney, Agent, or Firm* — Cherskov Flaynik & Gurda, LLC (57) ABSTRACT

The invention is directed to a process for making a dielectric ceramic film capacitor and the ceramic dielectric laminated capacitor formed therefrom, the dielectric ceramic film capacitors having increased dielectric breakdown strength. The invention increases breakdown strength by embedding a conductive oxide layer between electrode layers within the dielectric layer of the capacitors. The conductive oxide layer redistributes and dissipates charge, thus mitigating charge concentration and micro fractures formed within the dielectric by electric fields.

23 Claims, 8 Drawing Sheets

(56) References Cited

U.S. PATENT DOCUMENTS

| | | | |
|---|---|---|---|
| 2004/0072407 A1* | 4/2004 | Lung | H01L 27/11502 438/396 |
| 2006/0098385 A1* | 5/2006 | Sakashita et al. | 361/272 |
| 2006/0286762 A1* | 12/2006 | Tseng | H01L 21/31691 438/382 |
| 2007/0172592 A1* | 7/2007 | Trolier-McKinstry et al. | 427/287 |
| 2007/0236866 A1* | 10/2007 | Katoh | H01G 4/008 361/321.5 |
| 2008/0158777 A1* | 7/2008 | Sohn et al. | 361/321.1 |
| 2010/0079926 A1* | 4/2010 | Tan et al. | 361/311 |
| 2010/0096666 A1* | 4/2010 | Ishida | H01G 4/1245 257/190 |
| 2010/0296223 A1 | 11/2010 | Myers et al. | |
| 2011/0002081 A1 | 1/2011 | Taylor et al. | |
| 2011/0075317 A1* | 3/2011 | Oikawa et al. | 361/303 |
| 2011/0101828 A1* | 5/2011 | Noda | H01L 41/0478 310/348 |

FOREIGN PATENT DOCUMENTS

| | | | |
|---|---|---|---|
| JP | 03052211 A | * | 3/1991 |
| JP | 10241993 A | * | 9/1998 |

OTHER PUBLICATIONS

S. Delprat, et al., Voltage and frequency dependent dielectric properties of BST-0.5 thin films on alumina substrates, IEEE Microwave and Wireless Components Letters 13 (2003), p. 211.

Beihai Ma, et al., Dielectric properties of PLZT film-on-foil capacitors, Material Letters 62 (2008), pp. 3573-3575.

U. Balachandran, et al., Development of PLZT dielectrics on base metal foils for embedded capacitors, Journal of the European Ceramic Society 30 (2010), pp. 365-368.

David Malec, et al., Contribution to the understanding of the relationship between mechanical and dielectric strengths of Alumina, Journal of the European Ceramic Society 30 (2010, pp. 3117-3123.

Z. Suo, Models for breakdown-resistant dielectric and ferroelectric ceramics, Journal Mech. Phys. Solids, vol. 41, No. 7, (1993), pp. 1155-1176.

X. Wang, et al., Phase transition and high dielectric constant of bulk dense nanograin barium titanate ceramics, App. Phys. Lett. 89 (2006), p. 162902.

G.H. Haertling, Ferroelectric ceramics: history and technology, Journal Am. Ceram. Soc., 82 (1999), p. 797.

Y. Wang, et al., In-plane dielectric properties of epitaxial 0.65Pb(Mg 1/3 NB 2/3) O.35 PbTioO3 thin films in a very wide frequency range, App. Phys. Lett. 85 (2004), p. 1580.

D.C. Sinclair, et al., CaCu3Ti4O12: One-step barrier layer capacitor, Appl. Phys. Lett. 80 (200), p. 2153.

* cited by examiner

Figure 9. Weibull distribution of ≈0.7μm thick PLZT (a) without LNO insertion layer (b) with one LNO insertion layer Figure 10. Weibull distribution of ≈1.0 μm thick PLZT (a) without LNO insertion layer (b) with two LNO insertion layers

METHOD OF MAKING DIELECTRIC CAPACITORS WITH INCREASED DIELECTRIC BREAKDOWN STRENGTH

CONTRACTUAL ORIGIN OF THE INVENTION

The U.S. Government has rights in this invention pursuant to Contract No. DE-AC02-06CH11357 between the U.S. Department of Energy and UChicago Argonne, LLC.

FIELD OF THE INVENTION

The present invention relates to formation of high performance ceramic dielectric films. This invention relates to ceramic film capacitors, and more particularly, relates to compact and high energy density ceramic film capacitors, their associated structure and method of fabrication.

BACKGROUND OF THE INVENTION

The development of power electronic devices with improved performance, increased reliability, compacted size, and reduced weight requires the passive components, such as resistors, capacitors, inductors, and transformers, to be stacked or embedded within a printed wire board (PWB). This technology could free up surface space, increase device reliability, and minimize electromagnetic interference and inductance loss. The capacitance density of a dielectric is proportional to its relative permittivity ($\in_r$) divided by the thickness of the dielectric material. A high performance capacitor can be constructed using a dielectric with sufficient permittivity.

A high temperature capable capacitor can be fabricated by using ceramic film dielectric of high permittivity, such as perovskite ceramics having the general formula $ABO_3$. Thin ceramic films can be deposited on base metal foils, such as nickel and copper, to form film-on-foil sheets. These film-on-foils exhibit not only high relative permittivity ($\in_r \geq 1000$) and low leakage current density ($J_{leakage} < 1 \times 10^{-8}$ A/cm$^2$) but also high dielectric breakdown strength ($E_b \geq 2 \times 10^6$ V/cm). Energy that can be stored inside a capacitor is proportional to the square of applied voltage. It is highly desirable to have capacitors with high breakdown strength for power electronic applications, such as for use in electric drive vehicles.

Fabrication of capacitors, containing at least two electrical conductors separated by a dielectric, is affected by material and manufacturing limitations. Normal irregularities in the raw material or fabrication processes produce minor flaws or weaknesses within the capacitor structure. Typical variations in the composition or thickness of the electrodes may result in slight variations in the formation of the electrical field. Likewise, slight variations in the composition of the dielectric may result in differences in the localized physical and electrical properties within the dielectric. Further, fabrication processes for formation of the dielectric layer on the conductor may produce voids, inclusions or micro cracks, which again may result in differences in the localized composition and properties within the dielectric. When exposed to electric fields near the operating limits of the device these irregularities may concentrate the electric field over time to result in a breakdown of the device.

Figure 1:
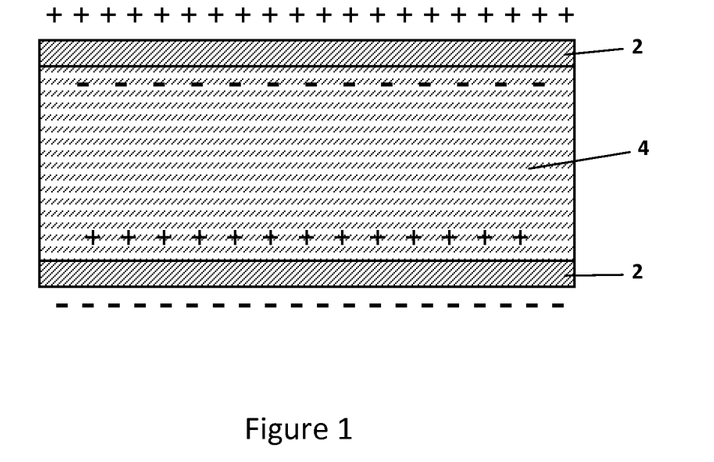
FIG. 1 is a cross-sectional view illustrating a single layer ceramic dielectric capacitor under external electric field.

A capacitor of two electrodes 2 separated by dielectric 4 is shown in the schematic drawing FIG. 1. When the capacitor is subjected to an external electrical potential, electric dipoles inside the dielectric 4 align in response to the applied electric field, resulting in net displacement charge accumulation near the electrodes 2. The effective field inside a dielectric material under external field is smaller than the applied field. When a ceramic dielectric material 4 is subjected to a substantially high electric field, dielectric breakdown can originate from defects inside the dielectric material or as a result of high electrical stresses. The dielectric breaks down when the current rises sharply at a critical electric field; permanent damage is often found along fine tubular channels or cracks, while the major portion of the sample is left intact. Similar to an applied mechanical load which causes mechanical fracture, an electric field can cause dielectric breakdown. The breakdown process is connected to an initiating microcrack, void, inclusion, tubular microflaw, or other types of defects that can trap substantial amounts of static charges to produce a local electric field exceeding a threshold value. This leads to the propagation of material failure. A defect-free sample breaks down at a field specific to the material, independent of the sample. This solid state phenomenon has been attributed to a few electrons in the conduction band, accelerated by the applied field, liberating more valance or trapped electrons.

Figure 2:
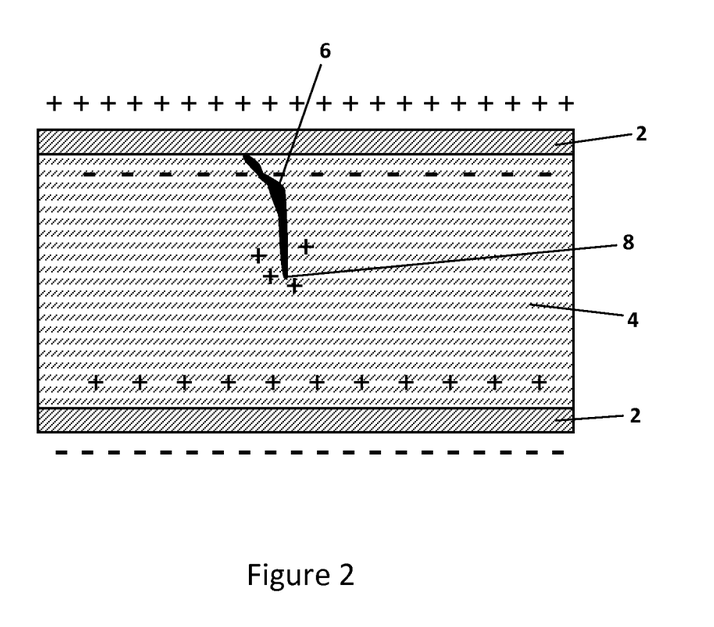
FIG. 2 is a cross-sectional view illustrating a microcrack initiated breakdown failure, wherein high concentration of static charge can be trapped at the tip of the crack and lead to a local field exceeding the breakdown threshold, adjacent material fails and breakdown path propagates.

A micro-crack initiated failure, as shown in FIG. 2 is used as example for discussion. The formation and propagation of crack 6 is strongly related to the electric field (or charge concentration) at the tip of the crack. During aging process (i.e. under a low applied field) the local electric field at the tip 8 can be reduced by the injected space charge (field limiting space charge). As a result, the crack propagates slowly from one electrode to the other one. On the other hand, during dielectric breakdown test (i.e. when the applied voltage is continuously increasing) and under special conditions (i.e. a little field moderation in particular regions of the sample), the energy for the formation and the propagation of the filamentary crack may be quickly reached, leading to catastrophic breakdown. In ferroelectric materials, structural defects related to electrostriction (inverse piezoelectric effect) can potentially cause aggregated dielectric breakdown.

Breakdown of capacitors is a performance-limiting property in circuits. The measured breakdown strength is sensitive to defects, electrodes (both material and geometry), and environment.

U.S. Pat. No. 7,436,650 discloses a laminated ceramic capacitor with a stress relieving layer formed between capacitance layers to provide high breakdown voltage. The stress relieving layer, ceramic dielectric layers, dummy inner electrode layers (split electrodes) that do not contribute to the formation of electrostatic capacitance, and capacitance-formation-preventing inner electrode layers that prevent capacitance from being formed between the capacitance-forming inner electrode layers and the dummy inner electrode layers are laminated. The stress relieving layers increase the capacitor's breakdown strength.

A need exists in the art for capacitors with high breakdown strength for power electronic applications. The capacitor should be designed so as to avoid catastrophic breakdown within the ceramic dielectric films.

SUMMARY OF INVENTION

An object of the invention is to provide a capacitor that overcomes many of the disadvantages of the prior art.

Another object of the present invention is to provide a dielectric capacitor with high breakdown strength and high energy density for power electronic applications. A feature of the invention is to provide a means to control and prevent the propagation of material defects from resulting in a conductive conduit or route between electrodes. An advantage of the invention is that the modified dielectric structure redistributes the trapped charge over a larger cross-sectional area to reduce mechanical strain resulting from electrically induced stress on the dielectric in turn increasing breakdown strength and capacitance.

Another object of the present invention is to minimize the effect of physical variations within the dielectric. A feature of the invention is the formation of a better conductive zone to redistribute the charge over a larger area. An advantage of the invention is to provide an embedded barrier to block or slow down the growth of structural defects which act as a conduit/route for charge transfer between electrodes.

Another object of the present invention is to reduce catastrophic failure of the dielectric so as to reduce electrical damage to the host system. A feature of the invention is to provide a physical barrier within the dielectric material to slow down or block the propagation of a physical break in the dielectric. An advantage of the invention is the formation of a structure embedded within the dielectric to alleviate rapid dielectric breakdown.

In brief, the invention provides a process for forming a capacitor and a capacitor formed from dielectric material between two conductors with a conductive oxide layer embedded within dielectric at distance from either electrode. This invention comprises a method for fabrication of dielectric capacitors with increased dielectric breakdown strength, and more specifically, a method to enhance breakdown strength of a dielectric material through modification of material architecture. The dielectric material can be ceramic films on metal foils (film-on-foils) that can be stacked or embedded for producing high-performance practical capacitor devices.

In brief, in the present invention, the inventors disclose a process for making ceramic dielectric film capacitors with increased dielectric breakdown strength by embedding a thin conductive oxide ceramic layer within the matrix of ceramic dielectric materials and the resulting capacitor formed by the method.

The invention is directed a process of making ceramic film capacitors with increased dielectric breakdown strength, comprising: providing a bottom electrode; depositing a first dielectric layer on the bottom electrode; depositing a first conductive oxide on the first dielectric; depositing a second dielectric layer on the conductive oxide and depositing a top electrode, to form a laminated capacitor. In an embodiment of the invention the process further comprising attaching a first termination lead to the bottom electrode and attaching a second termination lead to the top electrode. The termination lead provides connection between electrode internal to the capacitor and other circuits. In another embodiment of the invention the dielectric is selected from the group consisting of lead zirconate titanate [Pb(Zr,Ti)O$_3$, PZT], lead lanthanum zirconate titanate [(Pb, La)(Zr,Ti)O$_3$, PLZT], lead magnesium niobate [Pb(Mg$_{1/3}$Nb$_{2/3}$)O$_3$, PMN], barium titanate [(BaTiO$_3$), BT], strontium titanate [SrTiO$_3$, ST], barium strontium titanate [(Ba,Sr)TiO$_3$, BST], calcium zirconate [CaZrO$_3$, CZ] and calcium copper titanate [CaCu$_3$Ti$_4$O$_{12}$, CCTO)] and combinations thereof. In another embodiment of the invention, the first conductive oxide layer is selected from the group consisting of LNO [lanthanum nickel oxide, LaNiO$_3$], LSMO [lanthanum strontium manganese oxide, (La,Sr)MnO$_3$], LSCO [lanthanum strontium cobalt oxide, (La,Sr)CoO$_3$], or SRO [strontium ruthenium oxide, SrRuO$_3$]. In an embodiment of the invention the dielectric can be a compound/composite of two or more of the above, such as a solid solution of CZ-BT. In an embodiment of the invention the bottom electrode is metal foil, metal sheet or metal coated non-conductive material. In still another embodiment of the invention the bottom electrode is a metal sheet or metal foil selected from the group consisting of aluminum, nickel, copper, iron, silver, gold, platinum, zinc, chromium, molybdenum and alloys thereof. In another embodiment of the invention the bottom electrode is a metal film coated on a silicon wafer with the metal coating selected from the group consisting of aluminum, nickel, copper, iron, silver, gold, platinum, zinc, chromium, molybdenum and alloys thereof. In another embodiment of the invention the bottom electrode are metal foil, metal sheet or silicon wafers with conductive oxide coatings selected from the group consisting of LNO [lanthanum nickel oxide, LaNiO$_3$], LSMO [lanthanum strontium manganese oxide, (La,Sr)MnO$_3$], LSCO [lanthanum strontium cobalt oxide, (La,Sr)CoO$_3$], or SRO [strontium ruthenium oxide, SrRuO$_3$]. In an embodiment of the invention each dielectric layer is from about 0.03 µm (micron) to about 20 µm (micron) thick. In another embodiment of the invention, each dielectric layer has a thickness of from about 0.1 µm (micron) to about 10 µm (micron). In an embodiment of the invention, the dielectric layer is from about 0.03 µm (microns, 30 nanometer) to about 0.5 µm (microns, 500 nanometer) thick for microelectronics applications. In yet another embodiment of the invention, the first conductive oxide layer is from about 0.003 µm (microns, 3 nanometers) to about 0.01 µm (micron, 10 nanometers) thick. In another embodiment of the invention, a second conductive oxide layer and a third dielectric layer is deposited between the second dielectric layer and the top electrode. Additional conductive oxide layers are of the same thickness as the first conductive oxide layer. In another embodiment of the invention, additional structures of paired conductive oxide layer and a dielectric layer can be added in between a dielectric layer and the top electrode. In another embodiment of the invention, the thickness of the conductive oxide layer is from about 0.05 percent to about 0.1 percent of the thickness of the dielectric layer. In an embodiment of the invention, bottom electrode is a metal or metalized silicon wafer (may consists of a silicon dioxide insulation layer).

An embodiment of the invention also includes a dielectric capacitor with increased dielectric breakdown strength, formed by the process discussed hereinabove. The dielectric capacitor comprises a bottom electrode, a first dielectric layer on the bottom electrode; a first conductive oxide layer on the first dielectric; a second dielectric layer on the first conductive oxide layer and a top electrode deposited on the second dielectric layer, to form a laminated capacitor. In another embodiment of the invention, the dielectric capacitor comprises a first termination lead attached to the bottom electrode and a second termination lead attached to the top electrode. In another embodiment of the invention, the dielectric is selected from the group consisting of PZT, PLZT, PMN, BT, ST, BST, CZ, and CCTO. In another embodiment of the invention, the conductive oxide layer is selected from the group consisting of LNO (lanthanum nickel oxide, LaNiO$_3$), LSMO [lanthanum strontium manganese oxide, (La,Sr)MnO$_3$], LSCO [lanthanum strontium cobalt oxide, (La,Sr)CoO$_3$], and SRO (strontium ruthenium oxide, SrRuO$_3$). In another embodiment of the invention, the bottom electrode is aluminum, nickel, copper, iron, silver, gold, platinum, zinc, chromium, molybdenum or alloys thereof. The thickness of the first dielectric layer and the second dielectric layer, in an embodiment of the invention, are as noted hereinabove. Further, the thickness of the first conductive oxide layer, in an embodiment of the invention, is as noted hereinabove. In another embodiment of the invention, a second conductive oxide and a third dielectric layer are placed between the second dielectric layer and the top electrode. In another embodiment of the invention, multiple ceramic film capacitors are stacked together and termination leads were attached to form a stacked ceramic film capacitor. In another embodiment of the invention, ceramic capacitors are embedded into a PWB and electrical connections are realized through via holes.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The inventors have developed a process of fabricating high capacitance density dielectric film capacitors, and in particular ceramic film capacitors. When ceramic dielectric films are subjected to high electric fields, breakdown can occur, very often originating from material flaws inside the matrix dielectric material. High electrical stresses analogous to high mechanical stresses that lead to micro crack formation are formed in the defect areas of the matrix and can cause dielectric breakdown. It is believed that embedding partially conductive layers by laminating thin conductive oxide layers within the matrix of ceramic dielectric materials, mitigate the propagation of the electrical breakdown stresses, thus, preventing or delaying dielectric breakdown. The layers will likely block the path for propagation of the breakdown charges by redistributing and dissipating the charge over the larger area of the conducting layer. When several conductive oxide layers are placed within a dielectric material matrix and the applied field is perpendicular to the to the plane of the laminated layers, any breakdown channel originating in one section of the dielectric material does not readily spread to the next section because it will be blocked and dissipated by an oxide conducting layer in its path.

Generally, high capacitance density capacitor can be fabricated by using thin film dielectric of high permittivity, such as perovskite ceramics having the general formula $ABO_3$, such as crystalline lead zirconate titanate [$Pb(Zr,Ti)O_3$, PZT], lead lanthanum zirconate titanate [$(Pb,La)(Zr,Ti)O_3$, PLZT], lead magnesium niobate [$Pb(Mg_{1/3}Nb_{2/3})O_3$, PMN], barium titanate ($BaTiO_3$, BT), strontium titanate ($SrTiO_3$, ST), barium strontium titanate [$(Ba,Sr)TiO_3$, BST], calcium zirconate ($CaZrO_3$, CZ), and calcium copper titanate ($CaCu_3Ti_4O_{12}$). In an embodiment of the invention the dielectric can be a compound/composite of two or more of the above, such as a solid solution of CZ-BT. In an embodiment of the invention the bottom electrode is metal foil or metal sheet. Thin ceramic films can be deposited on base metal foils, such as nickel and copper, to form film-on-foil sheets. These film-on-foils exhibit not only high relative permittivity ($\epsilon_r \geq 1000$) and low leakage current density ($J_{leakage} < 1 \times 10^{-8}$ A/cm$^2$) but also high dielectric breakdown strength ($E_b \geq 2 \times 10^6$ V/cm). Energy that can be stored inside a capacitor is proportional to the square of applied voltage. The dielectric ranges for the dielectrics noted herein and other suitable dielectrics are shown in Table 1 below. Resistivity for the aforementioned dielectrics is about $1 \times 10^9$ Ω-cm (1 GΩ-cm).

TABLE 1

Dielectric Constant of Selected Ferroelectric and Non-Ferroelectric Ceramics

| Material | Chemical formula | Dielectric constant | Reference |
|---|---|---|---|
| Strontium titanate | $SrTiO_3$ | 300-500 | [1] |
| Barium titanate | $BaTiO_3$ | 1250-10,000 | [2], [4] |
| Barium strontium titanate | $(Ba,Sr)TiO_3$ | 500-2000 | [3] |

TABLE 1-continued

Dielectric Constant of Selected Ferroelectric and Non-Ferroelectric Ceramics

| Material | Chemical formula | Dielectric constant | Reference |
|---|---|---|---|
| Lead zirconate titanate | $Pb(Zr,Ti)O_3$ | 1000-6000 | [4] |
| Lead lanthanum zirconate titanate | $(Pb,La)(Zr,Ti)O_3$ | 1000-6000 | [4] |
| Lead magnesium niobate - lead titanate | $Pb(Mg_{1/3}Nb_{2/3})O_3$—$PbTiO_3$ | 3000-24,000 | [4], [5] |
| Calcium copper titanate | $CaCu_3Ti_4O_{12}$ | 700-200000 | [6] |

References for dielectric properties [1] F. M. Pontes, E. J. H. Lee, E. R. Leite, E. Longo, and J. A. Varela, "High dielectric constant of $SrTiO_3$ thin films prepared by chemical process," J. Materials Science 35 (2000) 4783; [2] X. Wang, X. Deng, H. Wen, and L. Li, "Phase transition and high dielectric constant of bulk dense nanograin barium titanate ceramics," App. Phys. Lett. 89 (2006) 162902; [3] S. Delprat, M. Ouaddari, F. Vidal, M. Chaker, and K. Wu, "Voltage and frequency dependent dielectric properties of BST-0.5 thin films on alumina substrates," IEEE Microwave and Wireless Components Letters13 (2003) 211; [4] G. H. Haertling, "Ferroelectric ceramics: history and technology," J. Am. Ceram. Soc., 82 (1999) 797; [5] Y. Wang, Y. L. Cheng, K. C. Cheng, H. L. W. Chan, C. L. Choy, and Z. R. Liu, "In-plane dielectric properties of epitaxial $0.65Pb(Mg_{1/3}Nb_{2/3})O_3$—$0.35\ PbTiO_3$ thin films in a very wide frequency range," App. Phys. Lett. 85 (2004) 1580; and [6] D. C. Sinclair, T. B. Adams, F. D. Morrison, and A. R. West, "$CaCu_3Ti_4O_{12}$: One-step internal barrier layer capacitor," Appl. Phys. Lett. 80 (2002) 2153.

In an embodiment of the invention, the inventors have identified conductive perovskite materials such as, but not limited to, lanthanum nickel oxide (LNO), lanthanum strontium manganese oxide (LSMO), lanthanum strontium cobalt oxide (LSCO) or strontium ruthenium oxide (SRO) for the conducting oxide layer. In one embodiment, the resistivity for the conductive oxides ranges from about $1 \times 10^{-5}$ to about $1 \times 10^0$ ω-cm. In another embodiment of the invention the resistivity of the conductive oxides is from about $2 \times 10^{-4}$ ω-cm to about $1 \times 10^{-2}$ ω-cm. As noted hereinabove, the resistivity of the dielectric is about $1 \times 10^9$ ω-cm or higher.

Figure 3A:
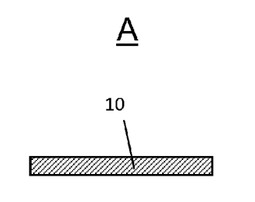
FIGS. 3a to 3f are a series of schematic diagrams illustrating the fabrication process of the invention, a) bottom electrode/metal foil, b) ceramic dielectric layer coated on bottom electrode, c) thin layer of conductive oxide overlaid on ceramic dielectric layer, d) ceramic dielectric layer on conductive oxide layer, e) steps c and d repeated and f) thin metal film top electrode on ceramic dielectric.
Figure 3B:
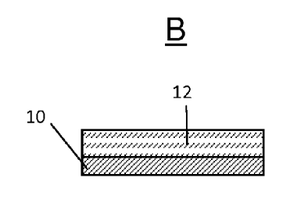
Figure 3C:
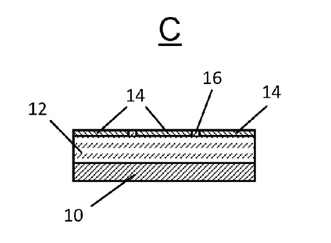
Figure 3D:
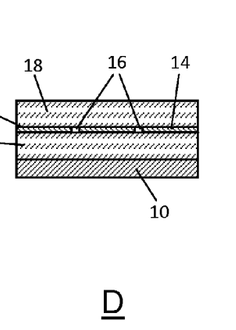
Figure 3E:
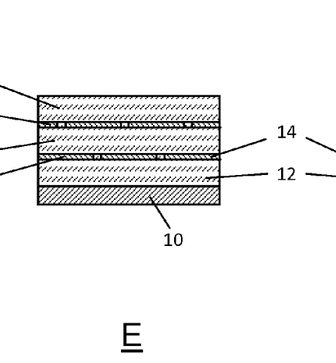
Figure 3F:
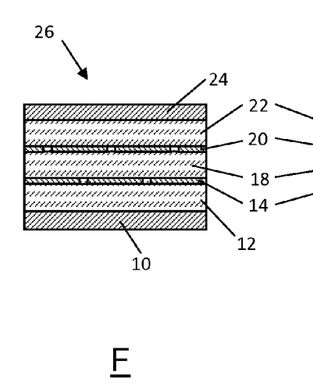

As shown in FIGS. 3a to 3f, small section of the conductive oxides, are deposited within the dielectric layer at selected distances from the conductive metal foil layers. The conductive oxide layers are thereby embedded within the dielectric. Initially, a bottom electrode, for example, the first electrode is polished to an appropriate surface finish and treated in a manner known in the arts. The basic bottom electrode 10 or first electrode as shown in FIG. 3a, is from about 0.1 µm (microns, 100 nanometers) to about 400 µm (microns, 400000 nanometers). In an embodiment of the invention, the bottom electrode is from 15 µm (microns, 15000 nanometers) to 100 µm (microns, 100000 nanometers). A first dielectric layer 12 is deposited by appropriate means on bottom electrode 10 to form the structure as shown in FIG. 3b. In an embodiment of the invention each dielectric layer is from about 0.03 µm (microns, 30 nanometers) to about 20 µm (microns, 20000) thick. In another embodiment of the invention each dielectric layer is from about 0.1 µm (microns, 100 nanometers) to about 10 µm (microns, 10,000 nanometers). In an embodiment of the invention, the dielectric thickness is from about 0.03 µm (microns, 30 nanometers) to about 0.5 µm (microns, 500 nanometers). In an embodiment of the invention, the dielectric layer may be deposited by sol gel deposition. A conductive oxide layer 14, in the range of 0.003 µm (microns, 3 nanometers) to about 0.01 µm (microns, 100 nanometers) is deposited on the surface of the dielectric to form the structure as shown in FIG. 3c. The conductive oxide layer may cover the dielectric in sections, with gaps 16 in the oxide layer over the entire surface of the first dielectric layer 12 or to some distance from the edge. In an embodiment of the invention the conductive oxide layer may be formed in a continuous layer of fixed thickness throughout. In an embodiment of the invention, the conductive oxide layer may be deposited by sputtering deposition. Other embodiments of the conductive oxide layer 14 will be described herein later. A second dielectric layer 18 is deposited on the surface of the conductive oxide layer 14, as shown in FIG. 3d and extends to cover any uncovered portion of the first dielectric layer 12. The process in 3c and 3d may be repeated, as needed to form additional conductive oxide layers 20 and third dielectric layers 22, as shown in 3e. A top electrode 24 is deposited on the third dielectric layer 22 to form a complete capacitance unit 26, as show in FIG. 3f. In an embodiment of the invention, the top electrode may be formed by electron beam evaporation. In an embodiment of the invention, the second dielectric layer is of the same thickness of the first dielectric layer. In another embodiment of the invention the top electrode may be from 0.01 µm (microns, 10 nanometers) to about 0.1 µm (microns, 100 nanometers) thick. Typically, the top electrode layer 24 may be thinner than the bottom electrode 10 inasmuch as the top layer is not necessary to confer mechanical strength to the module, when metal foil is used as the bottom electrode. In an embodiment of the invention, the total thickness of dielectric including conductive oxide layer embedded is from about 0.3 µm to about 30 µm. The bottom 10 and top electrode 24 are connected to output leads (not shown in this figure) to provide interface with other components electrical circuit. The process of forming capacitance unit 26 can be repeated to form a multi-layered dielectric capacitor unit. This will be discussed further in connection with FIG. 7.

In another embodiment of the invention, the bottom electrode is from about 0.1% to about 99.9% of the thickness of one capacitance unit. In an embodiment of the invention, dielectric layers are from about 2% to about 90% of the thickness of the capacitance unit. In another embodiment of the invention, the dielectric is from about 4% to about 50% of the thickness of the capacitance unit. A conductive oxide layer is from about 0.1% to about 0.9% of the thickness of a capacitance unit. The top electrode is from about 0.1% to about 8% of the thickness of a capacitance unit.

Figure 4:
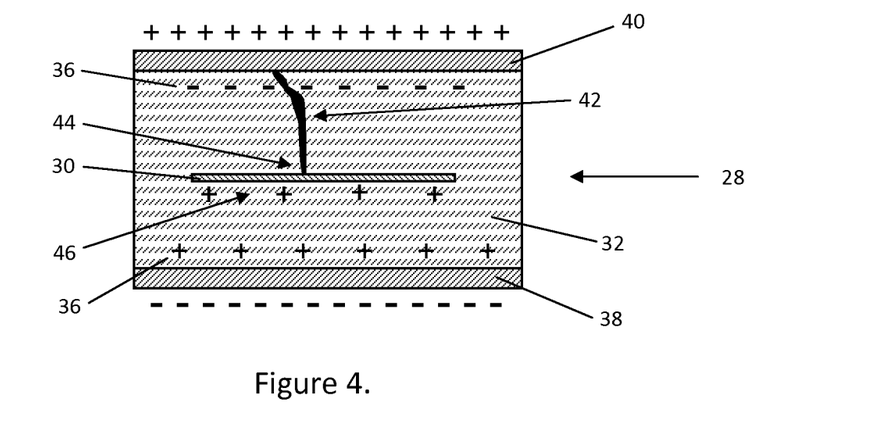
FIG. 4 is a cross-sectional view illustrating a defect initiated breakdown path blocked by a conductive oxide layer embedded in the ceramic dielectric.
Figure 5:
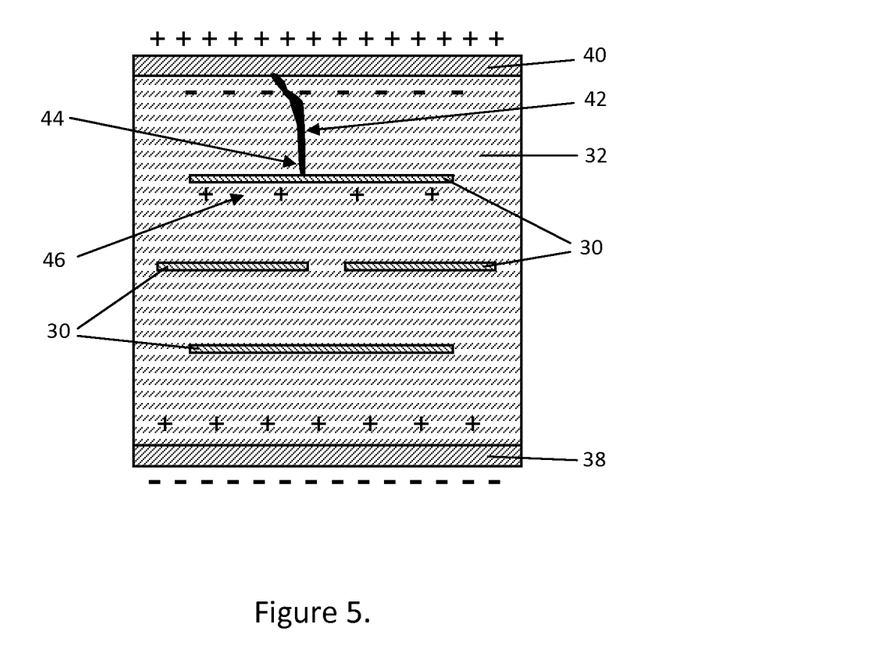
FIG. 5 is a cross-sectional view illustrating multiple conductive oxide layers laminated inside a ceramic dielectric material with applied electric field perpendicular to the laminates.

As shown in FIG. 4, a ceramic dielectric capacitor shown generally at 28 with a thin conductive oxide layer 30 embedded in the dielectric material matrix 32. A net displacement charge 36 is induced by the external potential applied between bottom electrode 38 and top electrode 40. The breakdown path 42 propagation is blocked because the trapped charge at the crack tip 44 is redistributed and dissipated over a larger area 46 of the dielectric. When there are several thin layers of conductive oxide layers 30 embedded within a dielectric material and the applied electric field is perpendicular to the plane of the laminated layers, any breakdown channel in one section of the dielectric material does not readily enter the next section separated by a conductive oxide layer, as illustrated in FIG. 5. The trapped charge dissipates via the conductive oxide layer to relieve the field concentration. This mechanism can result in a substantially tougher material with increased dielectric breakdown strength.

Figure 6:
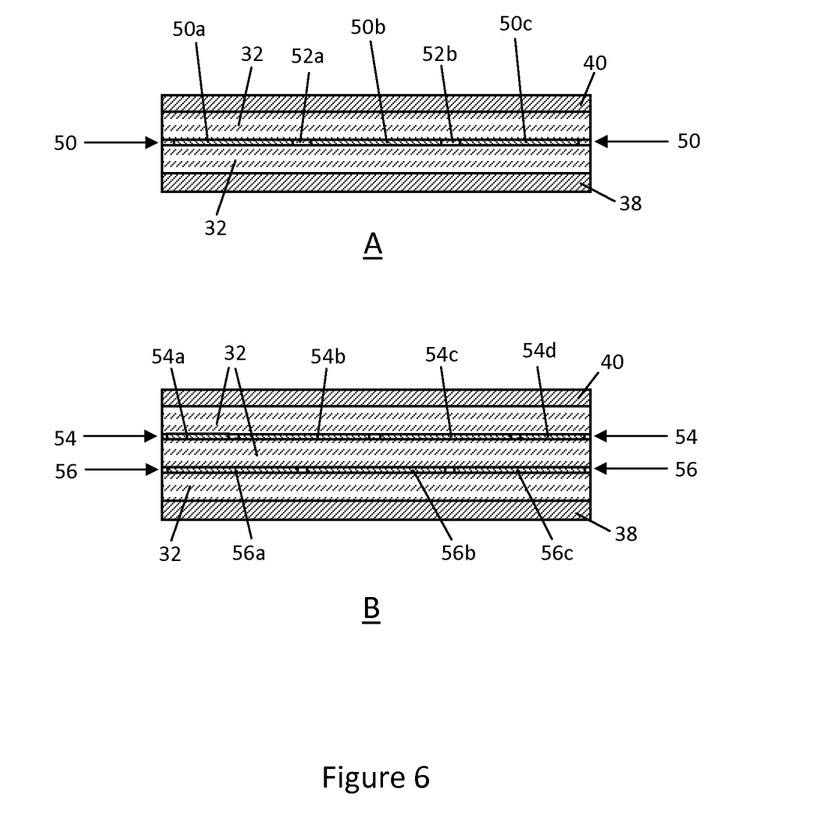
FIG. 6 is a cross-sectional view of film on foil with bottom electrode, top electrode, dielectric, and insertion layer(s) (a) one conductive oxide layer and (b) two conductive oxide layers, wherein the conductive oxide layer could be continuous, interconnected, or discontinuous.

In an embodiment of the invention, as shown in FIG. 6a, the embedded conductive oxide layer 50 may be formed with multiple sections 50a, 50b and 50c separated by gaps 52a and 52b. In another embodiment of the invention, as shown in FIG. 6b, multiple conductive oxide layers 54 divided into sections 54a, 54b and 54c and layer 56 divide into sections 56a b c provide spaced embedded layers to redistribute a charge path as it propagates through the dielectric layer. The conductive oxide layers 54 and 56 are arranged substantially perpendicular to the electric field. In another embodiment of the invention, additional structures of paired conductive oxide layer and a dielectric layer can be added in between a dielectric layer and the top electrode. The process of adding additional layer of conductive oxide and dielectric layers such that an $n^{th}$ conductive oxide layers and an $(n+1)^{th}$ dielectric layers deposited between the $n^{th}$ dielectric layer and the top electrode where $2 \leq n \leq 10$.

The conductive oxide layer is embedded within the dielectric layer intermediate between the first and second electrode, from 0 to 100 percent of the distance between electrodes. Where 0 percent means the conductive oxide layer is adjacent to the first electrode and 100 percent refers to the conductive oxide is adjacent to the second electrode. In another embodiment of the invention, the conductive oxide is located at from about 10 to about 90 percent of the distance between the first and second electrode.

When multiple conductive oxide layers are embedded within the dielectric layer intermediate between the first and second electrode, from about 0 to about 100 percent of the distance between the electrodes, each conductive oxide layer may be distributed between about 0 and about 100 percent of the distance. For example, in one embodiment, the first conductive oxide layer may be at 0 percent of the distance or effectively adjacent to the first electrode. In this example, the second conductive oxide layer may be at about 50 percent of the distance between the two electrodes. In another embodiment of the invention, when multiple conductive oxide layers are embedded, the first conductive oxide may be from about 10 to about 90 percent of the distance between the first and second electrode. The second conductive oxide layer in this alternate embodiment may be from about 10 to about 90 percent of the distance between the first and second electrode.

Figure 7:
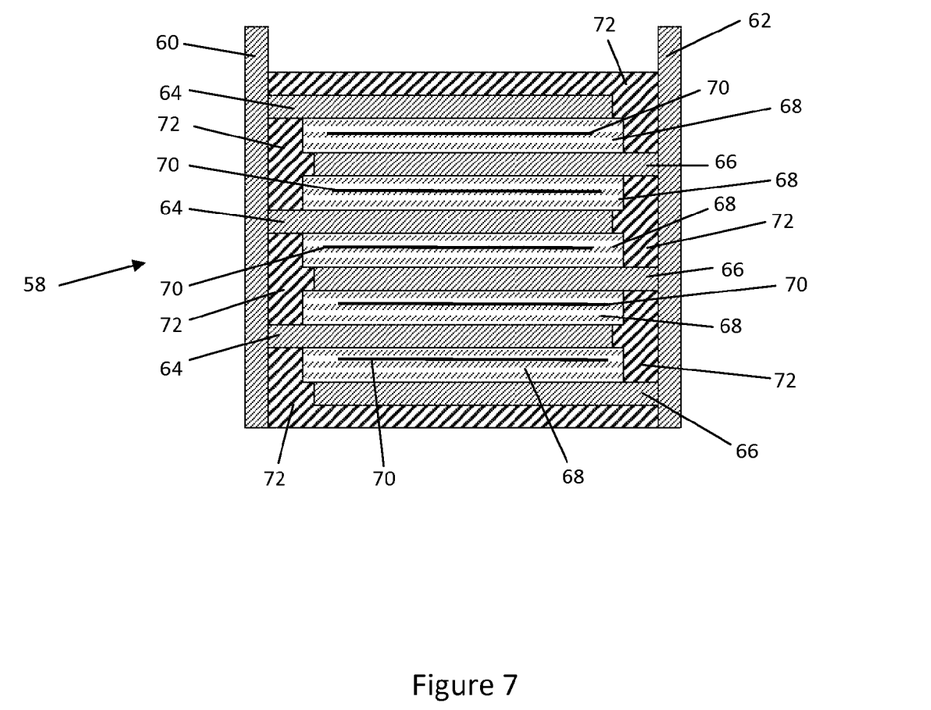
FIG. 7 is cross-sectional view illustrating an embodiment of the invention with multiple capacitance layers with termination leads attached.

FIGS. 3a to 3e, 4, 5, 6a and 6b present various embodiments and applications with a single dielectric layer divided by one or more layers of embedded conductive oxides. In another embodiment of the invention, as shown in FIG. 7, illustrating a capacitance device 58, with a first lead 60 and second lead 62. The first lead 60 connects with multiple first electrodes 64, while the second lead 62 connects with multiple second electrodes 66. The first electrodes 64 and second electrodes 66 are separated by dielectric layers 68, each containing embedded conductive oxide layers 70. The first electrodes 64 and second electrodes 66 are separated from the first leads 60 and second leads 62 by electrical insulation 72. While this example illustrate five capacitance dielectric layers 66, it would be obvious to one of skilled in the art to increase (or decrease) the number of capacitance layer to the number needed for the particular task. Typically, the invention of this patent is used with high performance film-on-foil capacitor; however, the invention is compatible with other capacitor designs. In one embodiment of the invention, the capacitance device 58 may be embedded within a PWB and first lead 60 and second lead 62 can be attached via holes to the capacitance device.

Conductive Oxide Layer Geometries

Figure 8A:
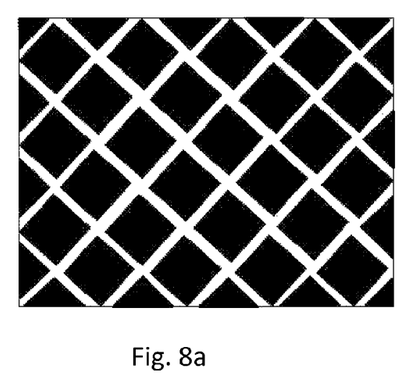
FIG. 8a-8e, illustrating different conductive oxide patterns, 8a) conductive oxide squares; 8b) alternating conductive oxide squares; 8c) diagonal conductive oxide wire grid; 8d) vertical and horizontal conductive oxide wire and 8e) conductive oxide grid pattern.
Figure 8B:
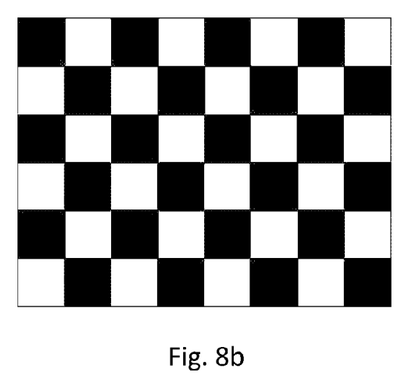
Figure 8C:
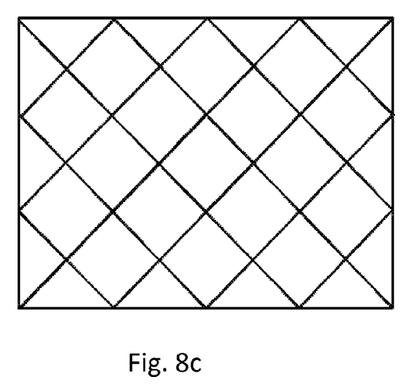
Figure 8D:
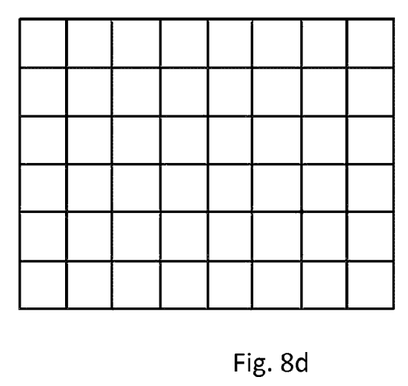
Figure 8E:
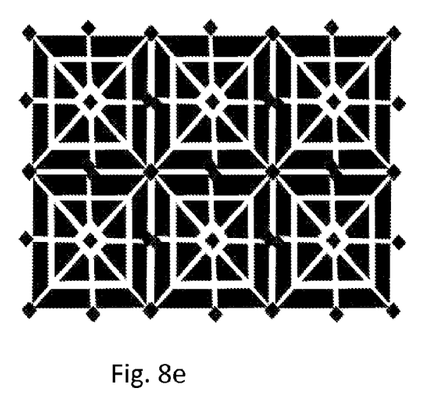

In one embodiment of the invention, as discussed hereinabove, conductive oxide layer may be formed in a continuous layer of fixed thickness throughout, with intermittent gaps in the conductive oxide layer. The conductive oxide layer may extend substantially for the front edge to the back edge. In another embodiment of the invention, the conductive oxide layer may be discontinuous (segmented) as in the appearance of flooring tiles, as shown in FIG. 8a, black squares representing pieces of conductive oxide and white color strips representing dielectric material uncovered by conductive oxide. Even though square shaped tiles are used in the illustration, please note that the tiles can be irregular in shape. In still another embodiment of the invention, the conductive oxide layer may be partially interconnected, when view from one of the electrodes, similar in nature to a chess board arrangement. In the chess board type arrangement, one color square represents a region occupied by the conductive oxide; while the alternate color square representing a region occupied dielectric material, as shown in FIG. 8b. In yet another embodiment, the conduct oxide layer may be in the form of a mesh or net, as shown in FIG. 8c and FIG. 8d from conductive oxide and embedded within the dielectric layer. In another embodiment of the invention, the conductive oxide layer may be in the form of a grid as shown in FIG. 8e.

Deposition of Materials

In an embodiment of the invention, bottom electrode layer may be formed by appropriate means known in the art, such as metal work (rolling and polishing) and metallized silicon wafers. Dielectric layer may be deposited by sol-gel synthesis route, atomic layer deposition (ALD), metal organic chemical vapor deposition (MOCVD) or physical vapor deposition (PVD) such as pulsed laser deposition and magnetron sputtering. Conductive oxide layers may be formed by radio frequency (RF) magnetron sputtering inside a vacuum chamber, pulsed laser deposition or may be formed by electron beam evaporation or thermal evaporation.

Examples of Deposition of Conductive Oxide LNO

LNO thin films were deposited by radio frequency (RF) magnetron sputtering inside a vacuum chamber at room temperature, with surrounding atmosphere containing argon and oxygen mixture (with Ar to $O_2$ ratio of 4:1). Chamber pressure was maintained 10 mTorr. The RF gun was operated at 80 W (corresponding to 4 W/cm$^2$). It takes ≈20 min to deposit a thin layer of 6 nm (0.006 μm) thick.

Deposition of PLZT by Solution Deposition

PLZT stock solution (0.5 M) was prepared by a modified sol-gel synthesis route using appropriate amount of lead acetate trihydrate, titanium isopropoxide, zirconium n-propoxide, and lanthanum nitrate. PLZT stock solution was spin coated onto bottom electrode at 3000 rpm for 30 sec, followed with pyrolysis about 450° C. for about 10 min and crystallization at about 650° C. for about 10 min. This process was repeated to build a dielectric ceramic film of a final desired thickness, with a range from about 0.03 μm to about 20 μm.

Test to Determine Breakdown Strength

Figure 9:
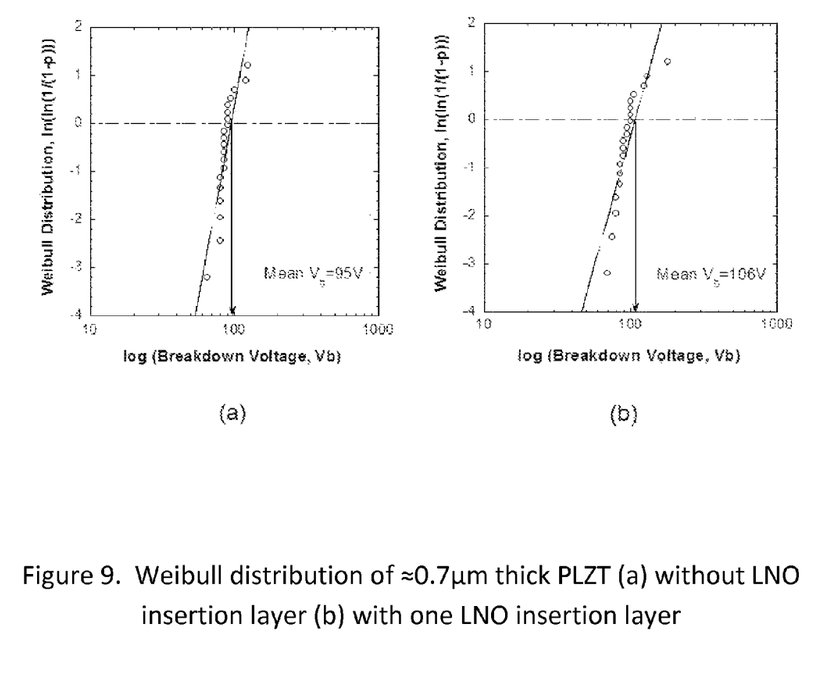
FIGS. 9a and 9b. are graphs of Weibull distribution of ≈0.7 μm thick PLZT layer verses log of breakdown voltage for samples (a) without and (b) with one LNO insertion layers.
Figure 10:
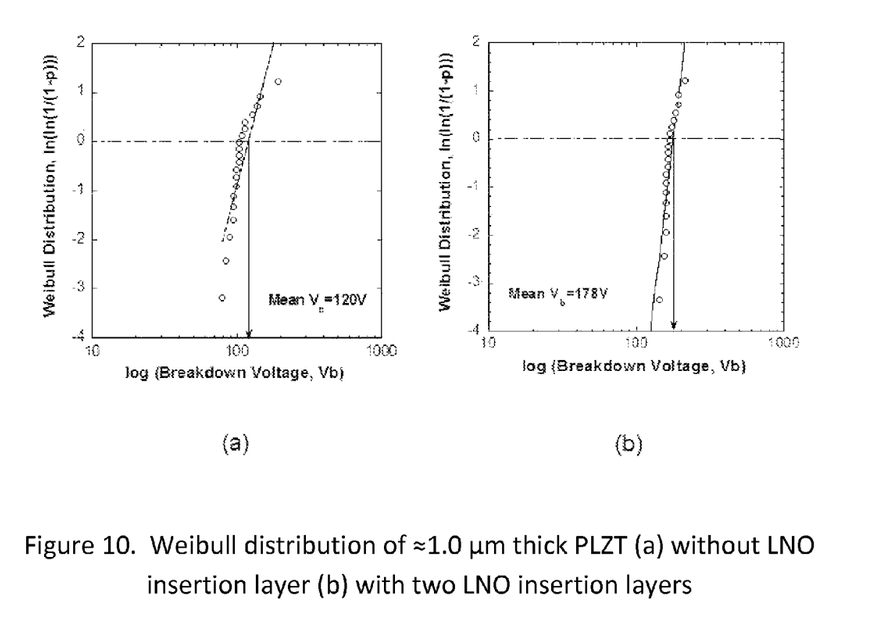
FIGS. 10a and 10b are graphs of Weibull distribution of ≈1.0 μm thick PLZT layer verses log of breakdown voltage for samples (a) without and (b) with two LNO insertion layers.

Weibull Analysis (Relevant to FIGS. 9 and 10)

Weibull analysis is a statistical analysis method first suggested by Waloddi Weibull (Weibull W 1951 A statistical distribution function of wide applicability J. Appl. Mech. 18, 293). It is wide used for failure analysis and life time prediction. Weibull analysis was used to determine the breakdown strength for various samples.

The empirical two-parameter Weibull function for failure probability distribution, also known as the "cumulative distribution function," can be written as, $$F(t) = 1 - \exp\left[-\left(\frac{t}{\eta}\right)^\beta\right]$$

where $\beta$ and $\eta$ are fitting parameters on the measurement of observable t. For breakdown field measurements, the applied field is the parameter of interest. Mean breakdown strength can be extracted from points where the fitting lines intersect with the horizontal line through $\ln(\ln(1/(1-p)))=0$.

Weibull analysis was performer on breakdown voltage obtain from a number of samples (Normally, about 25) of ≈0.7 thick PLZT layer for samples (a) without and (b) with one LNO (conductive oxide layer) insertion layers. The Weibull analysis indicates an increase in breakdown voltage to 106 V with a conductive oxide layer verses 95 V without a conductive oxide layer. This is an increase of 11 V in breakdown strength or approximately 12%. The test was repeated with approximately 1 micron thick PLZT dielectric with no LNO (conductive oxide layer) and two LNO (conductive oxide layer) layers. The Weibull analysis indicates an increase in breakdown voltage to 178 V with two conductive oxide layers verses 120 V without a conductive oxide layer. This is an increase of 58 V in breakdown strength or approximately 48%. The significant increase in breakdown strength with the use of the embedded conductive oxide within the dielectric of the invention provides improved capacitive performance.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

While the invention has been particularly shown and described with reference to a preferred embodiment hereof, it will be understood by those skilled in the art that several changes in form and detail may be made without departing from the spirit and scope of the invention.

The invention claimed is:

1. A process of making a dielectric laminated capacitor with increased dielectric breakdown strength, comprising:
   providing a bottom electrode having a bottom electrode thickness;
   depositing a first dielectric layer on the bottom electrode;
   depositing a first conductive oxide layer on the first dielectric layer;
   depositing a second dielectric layer on the conductive oxide layer wherein the conductive oxide layer is embedded within the first and second dielectric layers; and
   depositing a top electrode having a top electrode thickness on the second dielectric layer, to form a laminated capacitor wherein the conductive oxide layer is not in contact with the electrodes so as to redistribute trapped charges within the dielectric layers and wherein said top electrode thickness is less than the bottom electrode thickness wherein said conductive oxide layer comprises a layer having a thickness of 3 nm to 10 nm and wherein said electrodes and the conductive oxide layer are components of the laminated capacitor wherein said conductive oxide layer comprises a sputtered layer embedded between the first and the second dielectric layers and wherein the conductive oxide layer comprises between 0.1% to 0.9% of total thickness of the final laminated capacitor.

2. The process of claim 1, wherein the bottom electrode is a metal, or metal coated on silicon wafer.

3. The process of claim 1 wherein the dielectric is selected from the group consisting of lead zirconate titanate, lead lanthanum zirconate titanate, lead magnesium niobate, barium titanate, strontium titanate, barium strontium titanate, calcium zirconate and calcium copper titanate and combinations thereof.

4. The process of claim 1 wherein the conductive oxide layer is a compound selected from the group consisting of lanthanum nickel oxide, lanthanum strontium manganese oxide, lanthanum strontium cobalt oxide, strontium ruthenium oxide.

5. The process of claim 1 wherein the bottom electrode or the top electrode are a metal layer selected from the group consisting of aluminum, nickel, copper, iron, silver, gold, platinum, zinc, chromium, molybdenum and alloys thereof.

6. The process of claim 1, wherein each dielectric layer has a minimum thickness of from about 0.03 microns.

7. The process of claim 1 further comprising an $n^{th}$ conductive oxide layers and a $n^{th}+1$ dielectric layers deposited between the bottom electrode and the top electrode, wherein $2 \leq n \leq 10$.

8. The process of claim 1, wherein the thickness of the conductive oxide layer is from about 0.05 percent to about 0.1 percent of the thickness of the combination of the first and second dielectric layers.

9. The process of claim 1 further comprising attaching a first termination lead to the bottom electrode layer and attaching a second termination lead to the top electrode.

10. The process as recited in claim 1 wherein the conductive oxide layer is discontinuous.

11. The process as recited in claim 1 wherein the conductive oxide layer is in the form of a mesh.

12. The process as recited in claim 1 wherein the total thickness of the first and second dielectric layers and the conductive oxide layer is at least 0.3 microns.

13. A dielectric capacitor with increased dielectric breakdown strength, comprising: a bottom electrode having a bottom electrode thickness, a first dielectric layer deposited on the bottom electrode; a first conductive oxide layer deposited on the first dielectric layer; a second dielectric layer deposited on the first conductive oxide layer wherein the conductive oxide layer is embedded within the first and second dielectric layers, and a top electrode having a top electrode thickness deposited on the second dielectric layer to form a laminated capacitor wherein the conductive oxide layer is not in contact with the electrodes so as to redistribute trapped charges within the dielectric layers and wherein said top electrode thickness is less than the bottom electrode thickness wherein said conductive oxide layer comprises a layer having a thickness of 3 nm to 10 nm wherein said conductive oxide layer comprises a layer embedded between the first and the second dielectric layers and wherein the conductive oxide layer comprises between 0.1% to 0.9% of the total thickness of the final laminated capacitor.

14. The dielectric capacitor of claim 13 wherein the bottom electrode is a metal, or metal coated on silicon wafer.

15. The dielectric capacitor of claim 13 wherein the dielectric is selected from the group consisting of lead zirconate titanate, lead lanthanum zirconate titanate, lead magnesium niobate, barium titanate, strontium titanate, barium strontium titanate, calcium zirconate and calcium copper titanate and combinations thereof.

16. The dielectric capacitor of claim 13 wherein the first conductive oxide layer is a compound selected from the group consisting of lanthanum nickel oxide, lanthanum strontium manganese oxide, lanthanum strontium cobalt oxide, and strontium ruthenium oxide.

17. The dielectric capacitor of claim 13 wherein the bottom electrode or the top electrode are a metal layer is selected from the group consisting of aluminum, nickel, copper, iron, silver, gold, platinum, zinc, chromium, molybdenum and alloys thereof.

18. The dielectric capacitor of claim 13 further comprising an $n^{th}$ conductive oxide layers and an $n^{th}+1$ dielectric layers deposited between the bottom electrode and the top electrode, where $2 \leq n \leq 10$.

19. The dielectric capacitor of claim 13 wherein multiple laminated capacitors are stacked together.

20. The dielectric capacitor of claim 13 further comprising attaching a first termination lead to the bottom electrode and attaching a second termination lead to the top electrode.

21. The capacitor as recited in claim 13 wherein the conductive oxide layer is discontinuous.

22. The capacitor as recited in claim 13 wherein the conductive oxide layer is in the form of a mesh.

23. The capacitor as recited in claim 13 wherein the total thickness of the first and second dielectric layers and the conductive oxide layer is at least 0.3 microns.

* * * * *